(12) United States Patent
Jagota et al.

(10) Patent No.: US 11,244,238 B2
(45) Date of Patent: Feb. 8, 2022

(54) SEARCH QUERY RESULT SET COUNT ESTIMATION

(71) Applicant: salesforce.com, inc., San Francisco, CA (US)

(72) Inventors: Arun Kumar Jagota, Sunnyvale, CA (US); Kevin Han, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 1048 days.

(21) Appl. No.: 15/882,800

(22) Filed: Jan. 29, 2018

(65) Prior Publication Data
US 2019/0236475 A1   Aug. 1, 2019

(51) Int. Cl.
*G06N 7/00* (2006.01)
*G06N 20/00* (2019.01)
*G06F 16/901* (2019.01)
*G06F 16/2453* (2019.01)
*G06F 16/951* (2019.01)

(52) U.S. Cl.
CPC ....... *G06N 7/005* (2013.01); *G06F 16/24537* (2019.01); *G06F 16/9024* (2019.01); *G06N 20/00* (2019.01); *G06F 16/951* (2019.01)

(58) Field of Classification Search
CPC .... G06N 7/005; G06N 20/00; G06F 16/9024; G06F 16/24537; G06F 16/951
USPC .......................................................... 706/52
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |

(Continued)

OTHER PUBLICATIONS

Selectivity Estimation using Probabilistic Models ACM 1581133324/01/05 ACM SIGMOD May 21-24, 2001 (Year: 2001).*
U.S. Appl. No. 13/986,251, filed Apr. 16, 2013.

*Primary Examiner* — Alexey Shmatov
*Assistant Examiner* — Casey R. Garner
(74) *Attorney, Agent, or Firm* — Dergosits & Noah LLP; Todd A. Noah

(57) ABSTRACT

Search query result set count estimation is described. A system parses data set query that includes first query attribute and second query attribute. The system identifies first hierarchy of connected nodes including a first node representing a first query attribute, and a second hierarchy of other connected nodes including a second node representing a second query attribute. The system identifies a directed arc connecting first correlated node in first hierarchy to second correlated node in second hierarchy. The system identifies cross-hierarchy probabilities of correlations between values of a first attribute represented by the first correlated node and values of a second attribute represented by the second correlated node. The system outputs query result set estimated count generated from cross-hierarchy probabilities, probabilities that values of first attribute are associated with values corresponding to first node, and probabilities that values of second attribute are associated with values corresponding to second node.

17 Claims, 4 Drawing Sheets

(56) References Cited

U.S. PATENT DOCUMENTS

| | | | |
|---|---|---|---|
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 9,244,976 B1 * | 1/2016 | Zhang | G06F 16/2453 |
| 10,387,578 B1 * | 8/2019 | Xiao | G06F 16/24553 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2009/0259679 A1 * | 10/2009 | Thiesson | G06F 16/904 |
| 2012/0233137 A1 | 9/2012 | Jakobson et al. | |
| 2012/0278321 A1 * | 11/2012 | Traub | G06F 16/3331 707/736 |
| 2013/0218948 A1 | 8/2013 | Jakobson | |
| 2013/0218949 A1 | 8/2013 | Jakobson | |
| 2013/0218966 A1 | 8/2013 | Jakobson | |
| 2014/0040269 A1 * | 2/2014 | Sundaresan | G06F 16/355 707/737 |
| 2014/0359537 A1 | 12/2014 | Jakobson et al. | |
| 2015/0007050 A1 | 1/2015 | Jakobson et al. | |
| 2015/0095162 A1 | 4/2015 | Jakobson et al. | |
| 2015/0142807 A1 * | 5/2015 | Hofmann | G06N 3/02 707/737 |
| 2015/0172563 A1 | 6/2015 | Jakobson et al. | |
| 2018/0336202 A1 * | 11/2018 | Jahanbakhsh | G06F 16/9535 |
| 2018/0376000 A1 * | 12/2018 | Molander | H04M 3/2254 |

* cited by examiner

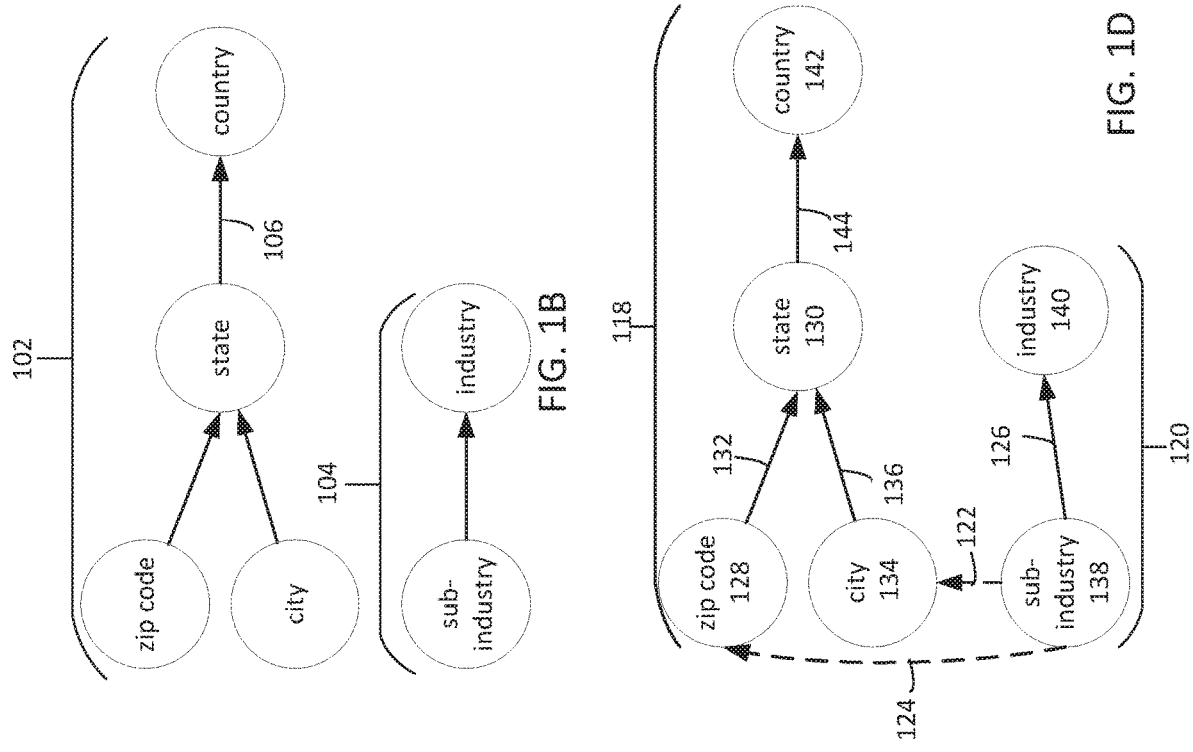
FIG. 1B
FIG. 1D
FIG. 1A
FIG. 1C

SEARCH QUERY RESULT SET COUNT ESTIMATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database system can retrieve digital objects' information in response to a user's query. For example, when a user submits a query that specifies a company, a database system responds with the company's name, web site, number of employees, annual revenue, industry, sub-industry, phone number, street address, city, zip, state, and country that is stored by electronic records for business accounts, the accounts' contacts, and business leads in a customer relationship management (CRM) database. A database query may have an AND-OR structure, in which the query is an AND of clauses, with each clause corresponding to a particular attribute, and inside a clause is an OR of literals, with each literal corresponding to a particular value of that attribute. For example, the database query Company=(Salesforce OR Google) AND Job Level=(C-level or VP-level) has two clauses that are connected by an AND, with two literals connected by an OR in each clause. The term segment denotes a particular tuple of values for a corresponding subset of attributes, such as the segment (Company=Salesforce, Job Level=C-level).

BRIEF DESCRIPTION OF THE DRAWINGS

In the following drawings like reference numbers are used to refer to like elements. Although the following figures depict various examples, the one or more implementations are not limited to the examples depicted in the figures.

FIGS. 1A, 1B, 1C, and 1D illustrate example directed graphs for search query result set count estimation, in an embodiment;

DETAILED DESCRIPTION

General Overview

Figure 2:
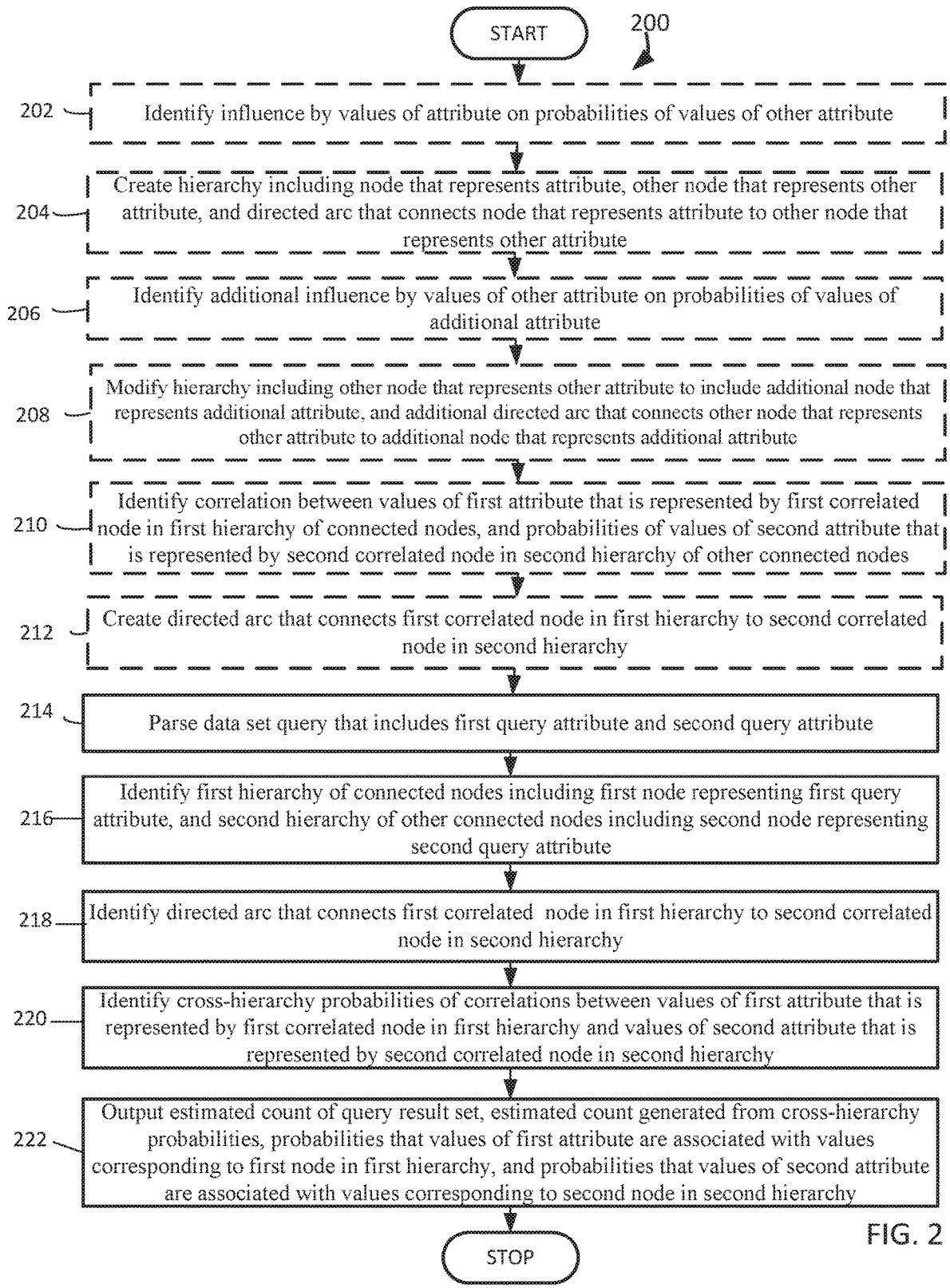
FIG. 2 is an operational flow diagram illustrating a high-level overview of a method for search query result set count estimation, in an embodiment.

A model may be trained and used to enable a database system to respond to a user's search query by estimating the number of search results the query would yield for a given data set. Model training involves training a model from a full data set. Model use involves using the trained model to generate an overall result count (or a sufficiently good approximation) for a given query.

A basic trained model can count and persist the number of results in a data set for every possible segment. Next, the basic trained model can expand a given query into its segments, which is equivalent to the basic trained model taking a conjunctive normal form of a query and transforming the query into its disjunctive normal form. Then the basic trained model can sum up the counts of these segments to obtain the overall result count. For example, the basic trained model expands the query (Company=Salesforce OR Google, Department=Sales or Marketing) to its expanded segments (Company=Salesforce, Department=Sales), (Company=Salesforce, Department=Marketing), (Company=Google, Department=Sales), and (Company=Google, Department=Marketing). However, the basic trained model may have a significant number of segments, such as millions of segments for a realistic data set of companies. Furthermore, since the number of segments in the disjunctive normal form of a complex query (a query containing many clauses and many literals) may be significantly large, the basic trained model's process of identifying and summing up the segments' counts can consume a significant amount of system resources and time. The basic trained model's size may be reduced by maintaining counts for only complete segments, which are segments that involve all of the attributes. However, in addition to expanding a query to its complete segments, this reduced size model would have to also expand each segment to its complete extensions. Consequently, restricting segments to complete segments would not generally decrease the reduced model size exponentially, and expanding the query to complete segments could exponentially increase the time to get the overall results count.

A data science model can provide a significantly more compact model, significantly faster model training, and significantly faster results count computation (or at least approximation) for a given query than the basic and reduced size models. The data science model can also enable trading off the accuracy of a result set size approximation for model simplicity in a continuum.

In accordance with embodiments described herein, there are provided systems and methods for search query result set count estimation. A system parses a data set query that includes a first query attribute and a second query attribute. The system identifies a first hierarchy of connected nodes including a first node representing the first query attribute, and a second hierarchy of other connected nodes including a second node representing the second query attribute. The system identifies a directed arc connecting a first correlated node in the first hierarchy to a second correlated node in the second hierarchy. The system identifies cross-hierarchy probabilities of correlations between values of a first attribute that is represented by the first correlated node in the first hierarchy and values of a second attribute that is represented by the second correlated node in the second hierarchy. The system outputs an estimated count of a query result set, the estimated count generated from the cross-hierarchy probabilities, probabilities that the values of the first attribute are associated with values corresponding to the first node in the first hierarchy, and probabilities that the values of the second attribute are associated with values corresponding to the second node in the second hierarchy.

For example, a database system parses a user's query for a database's records of healthcare industry companies located in New York state. The database system identifies a geolocation hierarchy of connected nodes which include a state node and an industrial hierarchy of connected nodes which include an industry node. The database system identifies a directed arc connecting a sub-industry node in the industrial hierarchy to a city node in the geolocation hierarchy and another directed arc connecting the sub-industry node to a zip code node in the geolocation hierarchy. The database system identifies sub-industry node values which specify probabilities that healthcare industry companies are primarily correlated with specific zip code node values for the city node values of Chicago, Houston, San Francisco, and New York. Without having to execute the query, the database system uses the probabilities that specify healthcare sub-industries are located in New York city zip codes, probabilities that the healthcare industry attribute encompasses the identified sub-industry node values, and probabilities that the New York state attribute encompasses the identified city and zip code nodes' values, to estimate that the database contains records for 3,600 healthcare companies in New York state. The user who submitted the query can use this estimate to revise the query parameters to request fewer or more results than the estimated number of results would provide, such as revising the query to request the database records for small-sized healthcare companies located in New York state.

In an illustrative mathematical example, a table has two independent attributes X and Y and is comprised of n rows. A data science model counts the number of rows in the table in which X=a and Y=b. Since $P(X=a, Y=b)=P(X=a)*P(Y=b)$, then the equation for n is: $n_{ab}=n*P(X=a)*P(Y=b)=n*(n_a/n)*(n_b/n)=n_a*n_b/n$, where $n_a$ and $n_b$ are the number of rows, with X=a and Y=b, respectively. The count of a segment whose attributes are independent in the data set may be obtained by multiplying the counts of the components of the segment. Thus, counts of combinations need not be explicitly stored, nor even computed. By assuming that attributes are independent (even when they are not) the model can efficiently obtain an approximation to the exact count. When n>>2, the equation above for n may be generalized to yield a segment count under the assumption that all of the attributes are independent. Since this assumption is often too strong, and may result in an (approximate) count that is very inaccurate, a Bayesian network may be used to model situations which span the two extremes of "all attributes are independent" and "no two attributes are independent." A Bayesian network is a directed graph whose nodes denote random variables and whose arcs encode certain dependencies among the random variables. This directed graph must be acyclic. The word "certain" is used intentionally, to avoid having to be precise, which is quite complex.

In an illustrative example, the variable $X_i$ is a direct cause of the variable $X_j$, in the sense that certain values of $X_i$ directly cause certain values of $X_j$ to become more probable or less probable. A Bayesian network can capture this relationship between $X_i$ and $X_j$ by creating an arc from the node for $X_i$ to the node for $X_j$. In an alternative example, if the values of $X_i$ and $X_j$ are correlated, but there is no known direction of causality, a Bayesian network might add an arc from the $X_i$ node to the $X_j$ node, or an arc from the $X_j$ node to the $X_i$ node, but not two arcs between both of these nodes because the directed graph is required to be acyclic. For any node $X_i$ in the directed graph, $\pi(X_i)$ denotes the nodes with arcs coming into $X_i$. Attached to the node $X_i$ is a probability distribution over the values of $X_i$. The probabilities of the various values of $X_i$ are allowed to depend only on the values of the attributes at the nodes in $\pi(X_i)$. That is, $P(X_i|X_1, \ldots, X_{j \neq i}, \ldots X_n)=P(X_i|\pi(X_i))$. Consequently, the joint distribution over all the nodes in the Bayes network has the factored form $P(X_1, \ldots X_n)=\Pi_i P(X_i|\pi(i))$. In this setting, a node corresponds to a searchable attribute, which is a clause in the afore-mentioned AND-OR query. The values at this node are the values possible for this attribute. In this notation, the AND-OR query may be represented by the equation $X_{i1}=(v_{i1,2}, \ldots v_{i1,mi1})$, $X_{i2}=(v_{i2,1}, \ldots v_{i2,mi2}), \ldots$.

In this equation, as in the search query that this equation models, not all attributes need be present, nor all values of those of the attributes are present. The model's goal is to efficiently estimate the number of results this query would yield in a given data set. The estimate is described by the following formula: $n*P(X_{i1}=(v_{i1,2}, \ldots v_{i1,mi1}), X_{i2}=(v_{i2,1}, \ldots v_{i2,mi2}), \ldots)$, where n is the total number of objects in the data set, and $P(X_{i1}=(v_{i1,2}, \ldots v_{i1,mi1}), X_{i2}=(v_{i2,1}, \ldots v_{i2,mi2}), \ldots$ is the probability that any particular object is in the result set of the query. To simplify notation, the values of the various attributes may be suppressed, keeping the values implicit, and the attributes may be renamed to $\chi_1, \ldots \chi_k$. Scripted notation here indicates the fact that the random variables take on sets of values, those in their corresponding clauses. Therefore, the model will compute $n*P(\chi_1, \ldots \chi_k)$. $P(\chi_1, \ldots \chi_k)$ may be computed using either of two extremes, plus various networks that span these two extremes.

The first extreme is when all attributes are independent. In this case, $P(\chi_1, \ldots \chi_k)=P(\chi_1)*P(\chi_2)* \ldots *P(\chi_k)$. Each of the terms on the right-hand side of this equation may be computed independently and then multiplied together. Note that $P(\chi_i)$ may be computed efficiently, as it involves just summing up values of the probabilities of various values of $X_{1i}$. This may be done very quickly, so long as no $\chi_i$ has a large set of values. Under this independent variable assumption, the model is very compact and trains very fast. This compact model models all distributions $P(\chi_1), P(\chi_n)$ independently. As an example, if each of the attributes has two values, storing this model involves storing just n numbers, one number for each $P(X_i)$. If an attribute has only two values, and the model records the probability of one value, then the model also has the probability of the other value. Since only the above-mentioned n probabilities need to be calculated, the model trains very fast.

At the other extreme, there are no independencies among the attributes. In this case, $P(\chi_1, \ldots, \chi_k)$ equals $\Sigma_{vk+1} \Sigma_{vk+2} \ldots \Sigma_{vn} P(\chi_1, \ldots, \chi_k|X_{k+1 \ldots n}=v_{k+1 \ldots n})* P(X_{k+1 \ldots n}=v_{k+1 \ldots n})$ This no independence formula is complex because it accounts for the possibility that any of the values of the attributes $X_{k+1}, X_{k+2}, \ldots X_n$ not mentioned in the query can influence the probability $P(\chi_1, \ldots, \chi_k)$. At this extreme, the model might do poorly in model complexity, training complexity, and query time results count estimation. To be able to compute $P(\chi_1, \ldots, \chi_k)$ for any subset of attributes $\chi_1, \ldots, \chi_k$ and for any particular value set to each of these attributes, the model needs to effectively store $P(X_{1 \ldots n}=v_{1 \ldots n})$ for every tuple of values $v_{1 \ldots n}=(v_1, v_2, \ldots, v_n)$ of these n attributes. Even when each of the n attributes contains only two values (which is the minimum possible), the model needs to store $2^n$ probabilities. Therefore, the model's size may be huge for a large n. Since the models effectively needs to compute $P(X_{1...n}=v_{1...n})$ for every tuple of values $v_{1...n}$ of these n attributes, the training time is exponential in n. As noted above, to compute $P(\chi_1, \ldots, \chi_k)$, the model has n–k nested summations, each involving summing over the values of its corresponding attribute. So even when all attributes are binary-valued, and even if the model spends just one unit of time in the inner-most summation, computing $P(\chi_1, \ldots, x_k | X_{k+1...n}=v_{k+1...n})*P(X_{k+1...n}=v_{k+1...n})$, the model will be spending $2^{n-k}$ units of time overall. The model cannot do any better at this extreme when computing exact result set counts. The model can generate approximate counts if such an amount of time cannot be spent on computations, or function under the assumption that most real-world use cases are not this extreme.

In some use cases, a system administrator may be able to design a reasonably good Bayes network structure manually, from domain knowledge. For a simple example, a model is based on the three attributes city, industry, and phone. FIG. 1A depicts an example Bayes network for a data set on the three searchable attributes: city, industry, phone, which may be used for the purposes of computing approximate result set counts. This Bayes network embodies the following assumptions: industry is (largely) independent of phone and city, while phone and city are correlated. In a more complex situation, a system administrator may be able to design a portion of the Bayes network by leveraging domain knowledge, but not design the entire network. Therefore, a suitable machine learning approach may be used to complete a Bayes network design from a data set.

The following example is based on a globally comprehensive data set on companies at various locations. This data set mainly has the following firmographic attributes: company name, web site, number of employees (binned), annual revenue (binned), industry, sub-industry, phone number, street address, city, zip, state, and country. A system administrator can design a portion of a Bayes network based on the following domain knowledge. FIG. 1B depicts a geolocation hierarchical structure 102 for the four geographical attributes: {zip, city}→state→country, and an industrial hierarchical structure 104 for the two industrial attributes: sub-industry→industry. The orientations of the FIG. 1B arcs makes sense from the probabilistic modeling perspective. The state→country arc 106 and the sub-industry→industry arc 108 capture the local probability distributions P(country|state) and P(industry|sub-industry), respectively. These code the system administrator's beliefs that the values of the state attribute influence the probability of the values of the country attribute and the values of the sub-industry attribute influences the probability of the values of the industry attribute. The term "influences" is used intentionally, instead of a term such as "uniquely determines," which is often used for hierarchical structures. Since the value of the state attribute influences the probability of the various values of the country attribute, the use of the term influences enables multiple countries to have the same state name. Further to the example, the system administrator needs to determine whether to add any arcs crossing the two connected components in FIG. 1B.

In response to the query (city=CI, state=ST, country=CO), the model estimates the number of results in the data set that match this query. In view of the constraints in FIG. 1B, the model computes P(city, state, country)=P(country|state)*P(state|city)*P(city). To compute P(city) for arbitrary cities, the model needs to track the number of records per city. Therefore, if the data set contains 10,000 unique cities, the model needs to store 10,001 counts, with the additional count storing the sum of the counts over all the cities. P(state|city) may be stored in a table indexed by the pair (city, state). Note that this table will be very sparse. Specifically, for any given city, there will likely only be a few states in which that city occurs. The model can take advantage of this sparsity in storing P(state|city)compactly. P(country|state) will have the same characteristics as P(state|city) structure-wise and sparsity-wise.

Consequently, the portion of the model needed to compute P(city, state, country) is compact. Furthermore, P(city, state, country) for any one triplet (city=CI, state=ST, country=CO) may be computed very quickly. This just involves calculating each of the three factors in the right-hand side of the equation for P(city, state, country), and multiplying these factors together. Collectively this may be executed in practice in constant time, assuming the model is stored in a medium—such as RAM memory—supporting very fast lookups of each of these three factors.

Note that the equation for P(city, state, country) is rich enough to accommodate a city with the same name being in multiple states, possibly spanning multiple countries. As an example, Paris is not only a city in the country France, Paris is also a city in many different states in the United States of America. The query P(city∈C, state∈S), where C is some set of cities and S is some set of states, may be equated to $\Sigma_{c \in C, s \in S} P(state=s|city=c)*P(city=c)$. To execute this P(city∈C, state∈S) equation efficiently, the model takes advantage of the near-hierarchical relationship city→state. Specifically, for every city c, the model assumes that there are only a few states s for which P(state=s|city=c) is greater than 0, and usually there is just one state for each city. To leverage this property, a system administrator can create a forward index from the node city which maps every city c to the states s having a non-zero probability for P(state=s|city=c). The revised P(city∈C, state∈S) equation makes explicit how the model leverages this property efficiently: P(city∈C, state∈S)=$\Sigma_{c \in C, s \in \pi(c)} \Sigma_{s \in \pi(c) \cap S}$ P(state=s|city=c) P(city=c), where π(c) denotes the states in which city c appears. In view of the assumed sparsity of π(c) the revised P(city∈C, state∈S) equation executes significantly faster than the previous P(city∈C, state∈S) equation. This revised equation may be generalized to any query on which the variables are on a directed path. The following illustrative example is based on the query $P(x_{i1} \in S_{i1}, x_{i2} \in S_{i2}, \ldots, x_{ik} \in S_{ik})$, where $(x_{i1}, \ldots, x_{ik})$ forms a directed path in the Bayes network, and $S_{i1}, \ldots, S_{ik}$ are arbitrary subsets of the value sets at their corresponding nodes. For the query P(city∈C, state∈S, country∈CTR), the generalized form of the previous revised P(city∈C, state∈S) equation is P(city∈C, state∈S, country∈CTR)=$\Sigma_{c \in C, s \in \pi(c) \cap S} \Sigma_{s \in S, cr \in \pi(s) \cap CTR} \Sigma_{cr \in CTR}$ P(country=cr|state=s)*P(state=s|city=c)*P(city=c).

The directed graph is a collection of one or more weakly connected components, each modeling a near-hierarchy on its nodes. For example, FIG. 1B depicts two weakly connected components, representing geolocation and industry hierarchies respectively. "Near-hierarchy" means that for every arc X→Y, a value of X almost always uniquely determines a value of Y. For example, the arc city→state represents that most city names are found in only one unique state, while some city names are found in multiple states. Therefore, the partial network structure induction problem may be formalized as follows. Given domain knowledge and a data set, generate a partition of the nodes into weakly connected components, each representing a near-hierarchy, and generate arcs (representing the fine structure of the near-hierarchy) in each component. For example, two nodes A and B may provide domain-based evidence that they are in the same near-hierarchy, and furthermore that B is an ancestor of A. In another example, two nodes A and B may provide domain-based evidence that neither is an ancestor of the other, but the domain-based evidence may not specify whether or not A and B are in the same near-hierarchy. A system administrator can use a Bayesian approach to learn the partial network structure from the combination of such domain knowledge and the data set. The system administrator can use the domain knowledge to generate pseudo-examples that capture various sorts of prior beliefs. For each type of pseudo-example, the model can generate a certain number of pseudo-examples, depending on the type, thereby capturing the strength of conviction in a prior belief.

A system administrator may have two types of prior beliefs about two nodes A and B. $\eta_{A,B}$ denotes a positive number capturing the strength of conviction in this belief. The model generates $\eta_{A,B}$ ordered pairs (a, b) to capture this strength, where a denotes a value of A, and b denotes a value of B. The first type of prior belief is that B is an ancestor of A. The model generates $\eta_A$ distinct synthetic values for A, and $\eta_B$ distinct synthetic values for B. The system administrator chooses $\eta_A$ and $\eta_B$ to satisfy $\eta_A = d_B \eta_B$, where $d_B > 1$ denotes the average number of values in A that are descendants of any one value in B. If the system administrator has a prior point belief on what this value should be, the system administrator sets $d_B$ to that value. Otherwise, the system administrator somewhat arbitrarily sets $d_B = 10$. Next, to each value a of A, the model randomly assigns a value b of B. B=b will serve as the ancestor for A=a. Next, the model generates the $\eta_{A,B}$ ordered pairs (a, b) as follows. For the values $a_1, \ldots, a_{\eta_{A,B}}$, the model samples from the distinct values of A with replacement. Next, for every i=1, $\ldots$, $\eta_{A,B}$, the model sets $b_i$ to the value of B deemed the ancestor of $a_i$. For example, since a system administrator has a prior belief that Country is an ancestor of City, and a rough belief that a country on average has 40 distinct cities, the system administrator sets $d_B = 40$. If $\eta_{A,B} = 1,000$, then the model needs to generate 1,000 pseudo-examples to reflect this belief. Next, the model generates 400 different synthetic values for city, $c_1, \ldots, c_{400}$, and 10 different synthetic values for country, $ctr_1, \ldots, ctr_{10}$, respectively. Next, the model assigns each of the 400 distinct cities to a country, randomly chosen from $ctr_1, \ldots ctr_{10}$. Finally, the model generates the 1,000 cities in the pseudo-sample by first sampling from the 400 distinct cities with replacement 1,000 times, and next setting the value of country to the country associated with this city.

The second type of prior belief is that neither A nor B is an ancestor of the other. As in the first type of prior belief, the model generates $\eta_A$ distinct synthetic values for A and $\eta_B$ distinct synthetic values for B, but $\eta_A$ is not constrained by $\eta_B$ in this case. Next, the model generates $\eta_{AB}$ ordered pairs (a, b) by sampling $\eta_{AB}$ values from the distinct values of A with replacement, by independently sampling $\eta_{AB}$ values from the distinct values of B with replacement and pairing up the two samples. The intent is that the bivariate sample provide sufficient evidence for the many-to-many map between A and B to avoid the inference that one is an ancestor of the other. For example, the variable City has its 400 distinct synthetic values generated by the model, as in the previous example, and the variable Industry has 15 generated distinct synthetic values, and $\eta_{AB} = 1,000$. The model generates 1,000 cities from the 400 distinct cities with replacement, and generates 1,000 industries from the 15 distinct industries with replacement. For i=1, $\ldots$ , 1,000, the model pairs the $i^{th}$ city with the $i^{th}$ industry.

The model adds the real data to the pseudo-examples, and learns the structure of the Bayes network of the desired form from the combined data. For each attribute, the model computes its set of distinct values in the combined data set, and creates an ordered partition $\psi_1, \ldots, \psi_k$ of the attributes as follows. Two attributes are in the same partition if they have the same number of distinct values. The size of a partition is defined as the size of the value set of any of its attributes. Next, the model sorts the partitions in increasing order of size. The next step is better described in pseudo-code in view of its complexity:

```
for i = 1 to k
    for u ∈ ψ_k
        p ← find_parent (u, ψ_{k+1}, ..., ψ_n)
        Create arc u ← p unless p is null
    endfor
endfor
def find_parent (u, ψ_{k+1}, ..., ψ_n)
    for j = k + 1 to n
        For v ∈ ψ_j
            if is_near_IS_A(u, v)
                return u
            Endif
        endfor
    endfor
    return null
endfor
```

The method is_near_IS_A(u, v) operates on a data set $D = \{(x_u, x_v)\}$, where $x_u$ is a value of u and $x_v$ is a value of v. These pairs are assumed to be sampled from the marginal joint distribution $P(X_u, X_v)$ of the two random variables $X_u$ and $X_v$. Such a data set may be constructed by selecting just the columns $X_u$ and $X_v$ in the afore-mentioned combined data set intended for structure learning. From D, is_near_IS_A(u, v) first computes $n_v(x_u)$, the number of distinct values of v that co-occur at least once in D with value $x_u$ of u. If $n_v(x_u)$ equals 1 for every $x_u$, this implies that every $x_u$ maps uniquely to a value of u. Also note that u contains more distinct values than v. From these two a model can conclude that u IS_A v. The is_near_IS_A(u, v) involves relaxing this hard constraint. In more detail, in the sample $\{n_v(x_u)|x_{uj}$ is a distinct value of u, $m_{uv}$ denotes the mean of this sample, and $s_{uv}$ denotes its standard deviation. The method is_near_IS_A(u, v) inputs two thresholds m and s, and returns true if and only if $m_{uv} \leq m$ and $s_{uv} \leq s$. Plausible examples of these thresholds include m=1.1 and s=1.

The structure induced to this point, via a combination of domain knowledge and data, is a collection of one or more weakly connected components, each a near-hierarchy of nodes. If there is only one component, the system administrator is done. If there are at least two components, the system administrator considers adding arcs to capture dependencies among these components, should there be any significant ones. A concrete example can clarify some subtle issues. In the structure of FIG. 1B, the geographical attributes form the geolocation hierarchical structure 102 of nodes, and the two industrial attributes form the industrial hierarchical structure 104 of nodes. Since the attributes that cross hierarchies may not be independent of each other, the strength of the dependency between any cross-hierarchy attributes may be used to determine whether to model such a dependency. While ignoring such a dependency would simplify the model, this simplification could result in returning less accurate estimations of search query result set counts.

If the city and sub-industry attributes are strongly dependent, and the city and industry attributes are also dependent, the algorithm presented below will add an arc between the nodes for the city and sub-industry attributes, suitably oriented, and stop. The influence of the city attribute on the industry attribute will get modeled by rippling the influence of the city attribute and the sub-industry attributes, which is explicitly modeled by the arc between their two corresponding nodes to the parent node industry of the child node sub-industry. The idea is to favor simpler models while remaining sensitive to dependencies. FIG. 1C depicts an example directed graph that ripples dependencies through hierarchies. The influence of the city attribute on the sub-industry attribute is explicitly modeled via the arc 110 from the city node 112 to the sub-industry node 114. The indirect influence from the city attribute to the industry attribute, depicted in the dashed arc 116 in FIG. 1C, is modeled by the path city→sub-industry→industry.

The network input to this algorithm is a directed acyclic graph assumed to contain at least two weakly connected components. The algorithm does not change the structure within any component. The algorithm only adds arcs (as needed) that cross components as needed while maintaining the acyclicity of the resulting directed graph. The algorithm orders the weakly connected components in order of least number of nodes first, breaking ties arbitrarily. Next, the algorithm considers every pair of components (i, j), i<j in order of increasing i, and (for the i) increasing j. Note that i and j are the indices of the components in the aforementioned ordering. On a given pair (i, j) the algorithm tries to add at least one arc from component i to component j as described below.

The algorithm renames the two components the above-mentioned inner loop is operating on, A and B. The algorithm tries to add arcs from certain nodes in A to certain nodes in B. The algorithm creates partial orderings of the nodes in A and the nodes in B (separately). This is done using the so-called topological sort algorithm. $A_s$ and $B_s$ denote the partial ordering of each set of nodes respectively. Note that each partial ordering is a sequence of sets. The first element of the sequence is the set of nodes with indegree 0. The second element is the set of nodes at distance 1 from those in the first element. The third element is the set of nodes at distance 2 from those in the first element, and so on. Next, the algorithm works as described below.

```
for i = 1 to |A_s|
    X = A_s[i] // The set of nodes at position i in A's partial ordering
    for j = 1 to |B_s|
        Y = B_s[j] // The set of nodes at position j in B's partial ordering
        For every pair (x, y) ∈ X × Y
            If x and y are sufficiently dependent
                Add the arc x → y.
        Endfor
        If at least one arc was added in the for loop above, exit from this stage of the algorithm.
endfor
```

As a test for "sufficient dependence" the model can use the mutual information measure from information theory, with a suitable threshold. In probability theory and information theory, the mutual information (MI) of two random variables is a measure of the mutual dependence between the two variables. More specifically, mutual information quantifies the "amount of information" (in units such as shannons, more commonly called bits) obtained about one random variable, through the other random variable. The concept of mutual information is intricately linked to that of entropy of a random variable, a fundamental notion in information theory, that defines the "amount of information" held in a random variable. Not limited to real-valued random variables like the correlation coefficient, mutual information is more general and determines how similar the joint distribution P(X, Y) is to the products of factored marginal distribution P(X)P(Y). The model can use a form of "normalized mutual information," (NMI) specifically I(X;Y)/sqrt(H(X)*H(Y)). If the value of NMI(X, Y) is 0, then X and Y are independent. If the value of NMI(X, Y) is sufficiently positive, then X and Y are deemed to be sufficiently dependent. Choosing a suitable threshold is a modeling decision for a specific use case.

Simulating a run of the algorithm on the example of FIG. 1B can clarify the algorithm's functioning. The algorithm orders the weakly connected components in order of least number of nodes first, resulting in the order {sub-industry, industry}, {city, zip, state, country}. The algorithm considers adding arcs from {sub-industry, industry} to {city, zip, state, country}. The algorithm partially orders the nodes in the two components, resulting in the orders <{sub-industry}, {industry}> and <{city, zip}, {state}, {country}>, respectively. The algorithm considers adding an arc from the sub-industry node to the city node and an arc from the sub-industry node to the zip code node. If a sufficient dependency exists among the corresponding random variables to add either or both of these arcs, then the algorithm adds any required arcs and stops. If no arc is added, the algorithm proceeds to consider adding an arc from the sub-industry node to the state node. If no arc is added, the algorithm proceeds to consider adding an arc from the sub-industry node to the country node. If no arc is added here, the algorithm considers adding arcs from the industry node to the city node and from the industry node to the zip node. If no arc is added, the algorithm proceeds to consider adding an arc from the industry node to the state node. If no arc is added, the algorithm proceeds to consider adding an arc from the industry node to the country node.

The algorithm orders the weakly connected components to ensure that the resulting directed graph remains acyclic. The algorithm exits from the inner loop as soon as at least one arc has been added in a particular next-level iteration to keep the model from becoming overly complex, in particular to avoid modeling "higher-level" dependencies that may be inferred from a modeled 'lower-level" dependency. When attempting to add arcs from one weakly connected component to another, the algorithm proceeds in the sequence of the partial orderings of the nodes to create arcs among the elements earlier in the partial orderings first, so their effects are easier to ripple down the partial orderings. For example, if the sub-industry attribute and the zip attribute were sufficiently dependent, and the sub-industry attribute and the city attribute were sufficiently dependent, then the algorithm would add two arcs to the network, resulting in the following extension of FIG. 1B's directed graph, as depicted in FIG. 1D. Substantially similar to FIG. 1B, FIG. 1D includes a geolocation hierarchical structure 118 of nodes, and industrial hierarchical structure 120 of nodes. During the automated structure completion phase, the model adds a sub-industry→city arc 122, and a sub-industry→zip code arc 124.

In order to estimate the number of records in a data set that match the query (state=NY, industry=Healthcare), the model needs to compute P(state=NY, industry=Healthcare):
P(state=N, industry=H)=$\Sigma_s \Sigma_c \Sigma z$(industry=H, sub=s, city=c, zip=z, state=N), where P(industry=H, sub=s, city=c, zip=z, state=N) equals P(sub=s) P(industry=H|sub=s) P(city=c|sub=s) P(zip=z|sub=s) P(state=N|city=c) P(state=N|zip=z).

In these equations, sub denotes sub-industry, and New York and Healthcare have been abbreviated to N and H, respectively. Since the query identifies the industry is H, the model follows the sub-industry→industry arc 126 in the reverse direction to find the sub-industries of industry H, as inferred by the model of FIG. 1D. Were these subindustries to uniquely determine H (such that a sub-industry does not belong to multiple industries), then P(industry=H|sub=s) would equal 1. The model is more general in that it can accommodate the same sub-industry being a child of multiple industries, together with differing probabilities. As an example, the model might deem bioinformatics as a sub-industry of the biotech industry with probability 0.9 (90%) and as a sub-industry of the IT industry with probability 0.1 (10%). These probabilities would be learned during the training of the model from the data. Now the model has the sub-industries of H together with their various probabilities (each of these would be 1 if sub-industries have unique parents, such as if the industry taxonomy is a true hierarchy). For each of these sub-industries, the model finds the cities in which these sub-industries are represented "sufficiently well." The sufficiently well test is done via a threshold on P(city=c|subindustry). For example, if 70% of the bioinformatics companies are in South San Francisco, 29% in Boston, the remaining 1% spread out elsewhere, and the threshold is 2%, then for the sub-industry bioinformatics the model would follow the sub-industry to city arc and identify only two cities: South San Francisco and Boston. Similarly, for each of these sub-industries, the model finds the zip codes in which these sub-industries are represented sufficiently well. This searching provides the model with the combinations (sub-industry=s, city=c, zip=z). For each such combination, the model computes the probability P(industry=H, sub=s, city=c, zip=z, state=N), as specified above. Then the model sums these probabilities.

The following example is based on the industry Healthcare having two main sub-industries, Healthcare Institutions and Medical Devices, with the sub-industry Healthcare Institutions located primarily in two cities, San Francisco and New York, and located primarily in four zip codes, 10001, 11104, 94016, and 94188, while the sub-industry Medical Devices is located primarily in two cities, Houston and Chicago, and located primarily in three zip codes, 77001, 60007, and 60827. The combinations may be succinctly listed as

| Sub-industry | City | Zip Code |
| --- | --- | --- |
| Healthcare Institutions | {San Francisco, New York} | {10001, 11104, 94016, 94188} |
| Medical Devices | {Houston, Chicago} | {77001, 60007, 60827} |

For this data, when a field contains a set of values, then all combinations of those values are taken with all combinations of the values from the other field in the same row. Therefore, the first row actually provides eight combinations since there are two cities and four zip codes, and the second row provides six combinations since there are two cities and three zip codes.

From the structure of the Bayes network in FIG. 1D, the model can deduce that the Healthcare Institutions sub-industry is in the cities of San Francisco and New York, whereas the Medical Devices sub-industry are in the cities of Houston and Chicago. Since the structure of the Bayes network in FIG. 1D does not directly model the dependency between the city and zip code nodes, (although it could), the model cannot prune the combinations to only those in which the zip codes are in the correct city. As an example, whereas there are four zip codes in the first row, the model does not know which zip codes are in the city of San Francisco and which zip codes are in the city of New York. Although the model cannot prune the combinations to those in which the (city, zip) are consistent, when the model computes the probabilities, the incompatible combinations will, in the above example, each have near-zero (if not zero) probability. For example, since the zip code 94016 is in the city of San Francisco, then the probability P(state=N|zip=94016) will be 0 because the dependency between the zip code and the state is modeled, and the zip code 94016 is in the state of California, not in the state of New York. Were the cities of one or both of these subindustries be all in New York, the combinations of the form (city=c, zip=z) where z is not a zip code in city c will not necessarily be 0, as P(state=N|zip=z) for each of these zip codes will be greater than 0, as will P(state=N|city=c). However, even though these probabilities are not zero, the product P(state=N|zip=z)*P(state=N|city=c) will be small, such that so the full probability of such a combination will not be high. Therefore, the Bayes network is simplified by not modeling the dependency between the city and zip code attributes. The (small) price that the model pays for this simplification is that the summed probabilities will be approximate. Finally, the model computes and then sums the probabilities of the various combinations. To efficiently compute the probabilities, the model maintains an inverted index that maps the industry attribute to its various sub-industry attributes. This set will usually be sparse, which enables fast computation of the terms involving sub-industries of industry=H.

Once the model determines the structure, the parameters are easy to determine. The model takes one more pass over the data set and from it compute, for every node i in the network, its local probability distribution $P(X_i|\pi(i))$. Here, the data set is the real data, minus the pseudo-examples. The pseudo-examples used generated synthetic values, which was for structure induction, but those values are not included in the local probability distributions. Some computations involve marginalizing over variables not in the query. Having an inverted index, such as an index that maps industries to their sub-industries, will help speed up such a query. To help speed up various queries, the model can create, for each node in the graph having at least one parent node, an inverted index that maps every value at node i to the tuples of values at the parents $\pi(i)$ each of which has non-zero probability.

The following example of how these inverted indices help speed up the computations, based on the Bayes network of FIG. 1B and the query (country=C, industry=I). The model needs to compute P(country=C|industry=I). $P(c=C|i=I)=\Sigma_{st} P(c=C|s=st)\Sigma_{ct, zp} P(s=st|c=ct, z=zp) \Sigma_{si} P(i=I|sub=si)$ The inverted indices will help the model compute the various sums efficiently. That is, for country C, its set of states st will be found efficiently, for a given state st, the set of pairs (city=ct, zip=zp) may be found efficiently, and sub-industries for industry I, may be found efficiently.

Using the example of FIG. 1 B, computing the approximate search results count for the query (country=USA) seems to be simple, but the computations are a bit involved: $P(country=USA)=\Sigma_{ST} P(country=USA | state=ST)*\Sigma_C P(state=ST|city=C)*P(city=C)$. Computationally, the model has to sum over certain probabilities over all the cities over all the states of the USA, which is computationally slower than optimal. If computations that involve the marginal P(state) are sufficiently common, the model can explicitly store this marginal on the node state, so as to avoid re-computing P(state=ST)=$\Sigma_C$ P(state=ST|city=C)*P(city=C) again and again. Similarly, the model could cache the marginal distribution P(country).

Since computing P(country=USA) requires the involved computation of P(state=ST), the model can cache the marginals P(state=ST) for states ST in the USA. Note that the model is not caching the full marginal distribution P(state), P(state), only its restriction to US states. This caching will make future queries needing calculation of P(state=ST) execute faster when ST is a state in the USA. The model can use the least recently used (LRU) scheme as the caching policy. That is, when memory needs to be re-claimed, the model ejects the least recently used marginals from the cache. Thus, probabilities needed in the computation of a recent query have a higher chance of being in the cache. This caching scheme tends to favor caching of marginals at nodes deep in a hierarchy, since these nodes get involved relatively more frequently in queries.

After the Bayes network has been trained, but before any queries have been executed, the model can "cold start" the cache by preloading the cache with marginals likely to have a relatively high hit rate. A sensible strategy is to favor loading marginals at nodes deeper in a hierarchy than shallower ones because the marginals at deeper nodes are involved in more queries than the marginals at shallower nodes. The model can implement this policy deterministically, such as starting loading from the deepest nodes first until the model exhausts the cache budget.

An alternative is to use a prior on the distribution of the queries. The model can then preload the cache by generating queries from this prior, such as simulated queries, and letting the query-time caching play out, which will tend to favor loading of marginals at deeper nodes if all nodes are roughly equally likely to be involved in a query. On the other hand, if the prior, which can leverage domain knowledge, favors certain nodes over others, the cache warming policy adjusts accordingly. Moreover, the prior can capture finer non-uniformities, such as those at the level of individual values, for example, that queries on (country=USA) are more popular than queries on certain other countries. Therefore, the prior-based approach is more general.

Systems and methods are provided for search query result set count estimation. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and systems for search query result set count estimation will be described with reference to example embodiments. The following detailed description will first describe a method for search query result set count estimation.

While one or more implementations and techniques are described with reference to an embodiment in which search query result set count estimation is implemented in a system having an application server providing a front end for an on-demand database service capable of supporting multiple tenants, the one or more implementations and techniques are not limited to multi-tenant databases nor deployment on application servers. Embodiments may be practiced using other database architectures, such as ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

FIG. 2 is an operational flow diagram illustrating a high-level overview of a method 200 for search query result set count estimation. An influence by values of an attribute on probabilities of values of another attribute is optionally identified, block 202. The system identifies hierarchical attributes. For example, and without limitation, this can include the database system identifying an influence by the zip code attribute's values on probabilities of the state attribute's values. In another example, the database system identifies an influence by the city attribute's values on probabilities of the state attribute's values. In yet another example, the database system identifies an influence by the sub-industry attribute's values on probabilities of the industry attribute's values. An influence can be an effect on things. A value can be the quantities, characters, or symbols on which operations are performed by a computer, being stored and transmitted in the form of electrical signals and recorded on magnetic, optical, or mechanical recording media. An attribute can be a piece of information that determines the properties of a field in a database. A probability can be the extent to which something is likely to occur, measured by the ratio of the favorable cases to the whole number of cases possible.

After an influence between two attributes' values is identified, a hierarchy is optionally created, the hierarchy including a node representing an attribute, and another node representing another attribute, and a directed arc connecting the node representing the attribute to the other node representing the other attribute, block 204. The system creates a hierarchy of attributes. By way of example and without limitation, this can include the database system creating the hierarchy 118 that includes a zip code node 128, a state node 130, and a directed arc 132 connecting the zip code node 128 to the state node 130, as depicted in FIG. 1D. In another example, the database system creates the hierarchy 118 that includes a city node 134, the state node 130, and a directed arc 136 connecting the city node 134 to the state node 130, as depicted in FIG. 1D. In yet another example, the database system creates the hierarchy 120 that includes a sub-industry node 138, the industry node 140, and the directed arc 126 connecting the sub-industry node 138 to the industry node 140, as depicted in FIG. 1D. A hierarchy can be an arrangement or classification of things according to relative importance or inclusiveness. A node can be a point at which lines or pathways intersect or branch; a central or connecting point. A directed arc can be a connection representing an effect on things that are arranged or classified according to relative importance or inclusiveness.

Following the identification of an influence between two attributes' values, an additional influence by values of one of the attributes on probabilities of values of an additional attribute is optionally identified, block 206. The system identifies additional hierarchical attributes. In embodiments, this can include the database system identifying an influence by the state attribute's values on probabilities of the country attribute's values.

Having created a hierarchy which includes a node an attribute, the hierarchy is optionally modified to include an additional node representing an additional attribute, and an additional directed arc connecting the node representing the attribute to the additional node representing the additional attribute, block 208. The system modifies the hierarchy of attributes to include additional attributes. For example, and without limitation, this can include the database system modifying the hierarchy 118 which includes the state node 130 to include a country node 142, and a directed arc 144 connecting the state node 130 to the country node 142. While this example describes and FIG. 1D depicts the hierarchy 118 with nodes at three hierarchical levels (the zip code and city nodes at the lowest level, the state node at a higher level, and the country node at the highest level), the database system can create and modify hierarchies of nodes to have any number of hierarchical levels.

After hierarchies are created, a correlation between values of a first attribute that is represented by a first correlated node in a first hierarchy of connected nodes, and probabilities of values of a second attribute that is represented by a second correlated node in a second hierarchy of other connected nodes is optionally identified, block 210. The system identifies correlations between hierarchies of attributes. By way of example and without limitation, this can include the database system using a mutual information measure to identify a sufficient dependency between the sub-industry attribute's values and the probabilities of the city attribute's values. In another example, the database system uses a mutual information measure to identify a sufficient dependency between the sub-industry attribute's values and the probabilities of the zip code attribute's values. A correlation can be a relationship between data. A correlated node can be a connecting point that is arranged or classified according to relative importance or inclusiveness, the connecting point representing data that has a relationship with other data. A hierarchy of connected nodes can be an arrangement classification of connecting points according to relative importance or inclusiveness.

Identifying a correlation may be based on determining whether values associated with a lowest correlated node in a hierarchy of connected nodes have any correlation before determining whether values associated with a higher correlated node in the hierarchy of connected nodes have any correlation, determining whether values associated with a highest correlated node in the hierarchy of connected nodes have any correlation before determining whether values associated with a lowest correlated node in another hierarchy of other connected nodes have any correlation, determining whether values associated with a higher correlated node in the other hierarchy of other connected nodes have any correlation before determining whether values associated with a highest correlated node in the other hierarchy of other connected nodes have any correlation, and terminating the determining when a hierarchical level of correlation is identified. For example, the database system determines whether sufficient dependency exists between the sub-industry attribute's values and the city attribute's values and/or the zip code attribute's values to add a directed arc from the sub-industry node 138 to the city node 134 and/or add a directed arc from the sub-industry node 138 to the zip code node 128. If a sufficient dependency exists among the corresponding values to add either or both of these directed arcs, then the database system adds any required directed arcs and stops. If no directed arc is added, the database system determines whether sufficient dependency exists between the sub-industry attribute's values and the state attribute's values to add a directed arc from the sub-industry node 138 to the state node 130. If a sufficient dependency exists among the corresponding values to add this directed arc, then the database system adds the required directed arc and stops. If no directed arc is added, the database system determines whether sufficient dependency exists between the sub-industry attribute's values and the country attribute's values to add a directed arc from the sub-industry node 138 to the country node 142. If a sufficient dependency exists among the corresponding values to add this directed arc, then the database system adds the required directed arc and stops.

If no directed arc is added, the database system determines whether sufficient dependency exists between the industry attribute's values and the city attribute's values and/or the zip code attribute's values to add directed arcs from the industry node 140 to the city node 134 and/or from the industry node 140 to the zip code node 128. If a sufficient dependency exists among the corresponding values to add either or both of these directed arcs, then the database system adds any required directed arcs and stops. If no directed arc is added, the database system determines whether sufficient dependency exists between the industry attribute's values and the state attribute's values to add a directed arc from the industry node 140 to the state node 130. If a sufficient dependency exists among the corresponding values to add this directed arc, then the database system adds the required directed arc and stops. If no directed arc is added, the database system determines whether sufficient dependency exists between the industry attribute's values and the country attribute's values to add a directed arc from the industry node 140 to the country node 142. If a sufficient dependency exists among the corresponding values to add this directed arc, then the database system adds the required directed arc and stops.

The database system stops determining whether sufficient dependency exists between attributes' values as soon as one level of directed arcs has been added, which prevents the model from becoming overly complex, in particular to avoid modeling higher-level dependencies that may be inferred from a modeled lower-level dependency. When attempting to add directed arcs from one hierarchy of connected nodes to another hierarchy of connected nodes, the database system proceeds in the sequence of the partial orderings of the nodes to create directed arcs among the nodes earlier in the partial orderings first, so their effects are easier to ripple down the partial orderings.

Following the identification of a correlation between correlated nodes in different hierarchies, a directed arc connecting a first correlated node in a first hierarchy to a second correlated node in a second hierarchy is optionally created, block 212. The system records a correlation between hierarchies of attributes. In embodiments, this can include the database system creating the directed arc 122 connecting the sub-industry node 138 to the city node 134.

In another example, the database system creates the directed arc 124 connecting the sub-industry node 138 to the zip code node 128.

Having modeled a data set, a data set query that includes a first query attribute and a second query attribute is parsed, block 214. The system processes queries' attributes. For example, and without limitation, this can include the database system parsing a user's query for a database's records of healthcare industry companies located in New York state. A data set query can be a request for information from a computer. A query attribute can be a piece of information that is identified in a data request and that determines the properties of a field in a database.

After parsing query attributes, a first hierarchy of connected nodes including a first node representing the first query attribute, and a second hierarchy of other connected nodes including a second node representing the second query attribute, are identified, block 216. The system identifies the queried attributes in hierarchies of attributes. By way of example and without limitation, this can include the database system identifying the geolocation hierarchy 118 of connected nodes which include the state node 130 and the industrial hierarchy 120 of connected nodes which include the industry node 140.

Following identification of hierarchies of connected nodes, a directed arc connecting a first correlated node in a first hierarchy to a second correlated node in a second hierarchy is identified, block 218. The system identifies a recorded correlation between hierarchies of attributes. In embodiments, this can include the database system identifying the directed arc 122 connecting the sub-industry node 138 in the industrial hierarchy 120 to the city node 134 in the geolocation hierarchy 118. In another example, the database system identifies the directed arc 124 connecting the sub-industry node 138 in the industrial hierarchy 120 to the zip code node 128 in the geolocation hierarchy 118. Although these examples describe and FIG. 1D depicts identifying directed arcs that connect two hierarchies of connected nodes, the database system can identify directed arcs that connect any number of hierarchies of connected nodes. While these examples describe and FIG. 1D depicts identifying directed arcs that connect two hierarchies of connected nodes via nodes that differ from the nodes that correspond to the query's attributes, the directed arcs can connect any correlated nodes in the different hierarchies of connected nodes. For example, the data set query can include these attributes, while the model correlates these other attributes:

| query attributes | model's correlated attributes |
| --- | --- |
| sub-industry, state | sub-industry with city and zip code |
| sub-industry, city | sub-industry with city and zip code |
| sub-industry, zip code | industry with city and zip code |
| sub-industry, city | industry with state |
| sub-industry, state | industry with city |

Having identified directed arcs that cross hierarchies of connected nodes, cross-hierarchy probabilities of correlations between values of a first attribute that is represented by a first correlated node in a first hierarchy and values of a second attribute that is represented by a second correlated node in a second hierarchy are identified, block 220. The system identifies probabilities of the recorded correlation between hierarchies of attributes. For example, and without limitation, this can include the database system identifying sub-industry node 138 values which specify probabilities that healthcare industry companies are primarily correlated with specific zip code node 128 values for the city node 134 values of Chicago, Houston, San Francisco, and New York. A cross-hierarchy probability can be can be the extent to which something is likely to occur, measured by the ratio of the favorable cases to the whole number of cases possible, within arrangements or classifications of things according to relative importance or inclusiveness.

After identifying cross-hierarchy probabilities, an estimated count of a query result set is output, the estimated count generated from cross-hierarchy probabilities, probabilities that values of a first attribute are associated with values corresponding to a first node in a first hierarchy, and probabilities that values of a second attribute are associated with values corresponding to a second node in a second hierarchy, block 222. The system uses the probabilities of the recorded correlation between hierarchies of attributes to estimate a query result set count. By way of example and without limitation, this can include the database system using the probabilities that specify healthcare sub-industries are located in New York city zip codes, probabilities that the healthcare industry attribute encompasses the identified sub-industry node values, and probabilities that the New York state attribute encompasses the identified city and zip code nodes' values, to estimate that the database contains records for 3,600 healthcare companies in New York state, without having to execute the query. An estimated count can be an approximate calculation of the number of something. A query result set can be a group of information obtained in response to a data request.

For this simplified example, the database stores 100,000 company records, 6,000 (6%) of these records are for companies located in New York state, and 5,000 (5%) of these records are for companies in the healthcare industry. An actual count of the database records for healthcare companies indicates the following distributions of data:

| % of healthcare companies | Sub-industry | Zip code | city |
| --- | --- | --- | --- |
| 48.0 | healthcare institutions | 10001 | New York |
| 24.0 | healthcare institutions | 11104 | New York |
| 12.0 | healthcare institutions | 94016 | San Francisco |
| 6.0 | healthcare institutions | 94188 | San Francisco |
| 4.5 | medical devices | 60007 | Chicago |
| 3.0 | medical devices | 60827 | Chicago |
| 1.5 | medical devices | 77001 | Houston |
| 1.0 | other | Other | other |

When the database system computes the probabilities for healthcare companies, the combinations that are incompatible with the query attribute for New York state will have zero probability. For example, since the zip code 94016 is in the city of San Francisco, then the probability of New York state given the zip code 94016 is 0 because the dependency between the zip code attribute and the state attribute is modeled, and the zip code 94016 is in the state of California, not in the state of New York. For this example, one probability that values of an attribute are associated with values corresponding to a node in a hierarchy is the 0% probability that the correlated San Francisco value of the correlated city attribute is associated with the queried New York value corresponding to the queried state attribute. Continuing this example, another probability is the 100% probability that the correlated New York City value of the correlated city attribute is associated with the queried New York value corresponding to the queried state attribute. In another example, if the query specified New York City instead of specifying New York state, one probability that values of an attribute are associated with values corresponding to a node in a hierarchy is the 0% probability that the correlated San Francisco value of the correlated city attribute is associated with the queried New York City value corresponding to the queried city attribute. Continuing this other example, another probability is the 100% probability that the correlated New York City value of the correlated city attribute is associated with the queried New York City value corresponding to the queried city attribute. Alternatively, if the query specified New York City and the state attribute was correlated, one probability that values of an attribute are associated with values corresponding to a node in a hierarchy is the 0% probability that the correlated California value of the correlated state attribute is associated with the queried New York City value corresponding to the queried city attribute. Continuing this alternative example, another probability is the 100% probability that the correlated New York value of the correlated state attribute is associated with the queried New York City value corresponding to the queried city attribute. Therefore, these probabilities may be for correlated values of a correlated attribute that is hierarchically higher, lower, or the same as the queried value of the queried attribute.

Consequently, the database system identifies the combined 72.0% (48.0%+24.0%) probabilities that a healthcare industry company is located in one of the zip codes (10001 and 11104) in New York City, which is in New York state. The database system multiplies the combined probability of 72.0% by 5,000, which is the number of healthcare company records in the database, to estimate the count of 3,600 records in the query's result set, without having to execute the query.

If a database system erroneously assumed that the state attribute and the industry attribute were attribute that are completely independent of each other, then such a database system could multiply the 6% probability that companies are located in New York state by the 5,000 companies are in the healthcare industry to estimate the count of only 300 records in the query's result set.

The estimated count may be for external data set results, internal data set results, relational database table results, and/or a comparison of external data set results to internal data set results. For example, the database system estimates that the query result set from the user's CRM system will include 3,600 healthcare companies in New York state, and estimates that the query result set from a subscription data service will include 10,000 healthcare companies in New York state. Such a comparison may enable a user to estimate the number of external data set results that may already be stored in an internal data set, and revise the original query if fewer or more external data set results are desired relative to the number of these results that may already be stored in the internal data set.

The data set query can include a third query attribute that lacks any connection to any hierarchy of connected nodes, and generating the estimated count may be further based on independent probabilities associated with the third query attribute. For example, the user can revise the original query to also specify a small company for the company size attribute so that the query of the subscription data service returns fewer than the estimated count of 10,000 records in the query result set. Since the company size attribute is completely independent of the state attribute and the industry attribute, the database system multiplies the 50% independent probability for the small company size value by the original estimate of 10,000 records for healthcare companies in New York state to estimate the count of 5,000 records for the revised query's result set. An independent probability can be the extent to which something is likely to occur, measured by the ratio of the favorable cases to the whole number of cases possible, and which is not influenced or affected by other possibilities.

The method 200 may be repeated as desired. Although this disclosure describes the blocks 202-222 executing in a particular order, the blocks 202-222 may be executed in a different order. In other implementations, each of the blocks 202-222 may also be executed in combination with other blocks and/or some blocks may be divided into a different set of blocks.

System Overview

Figure 3:
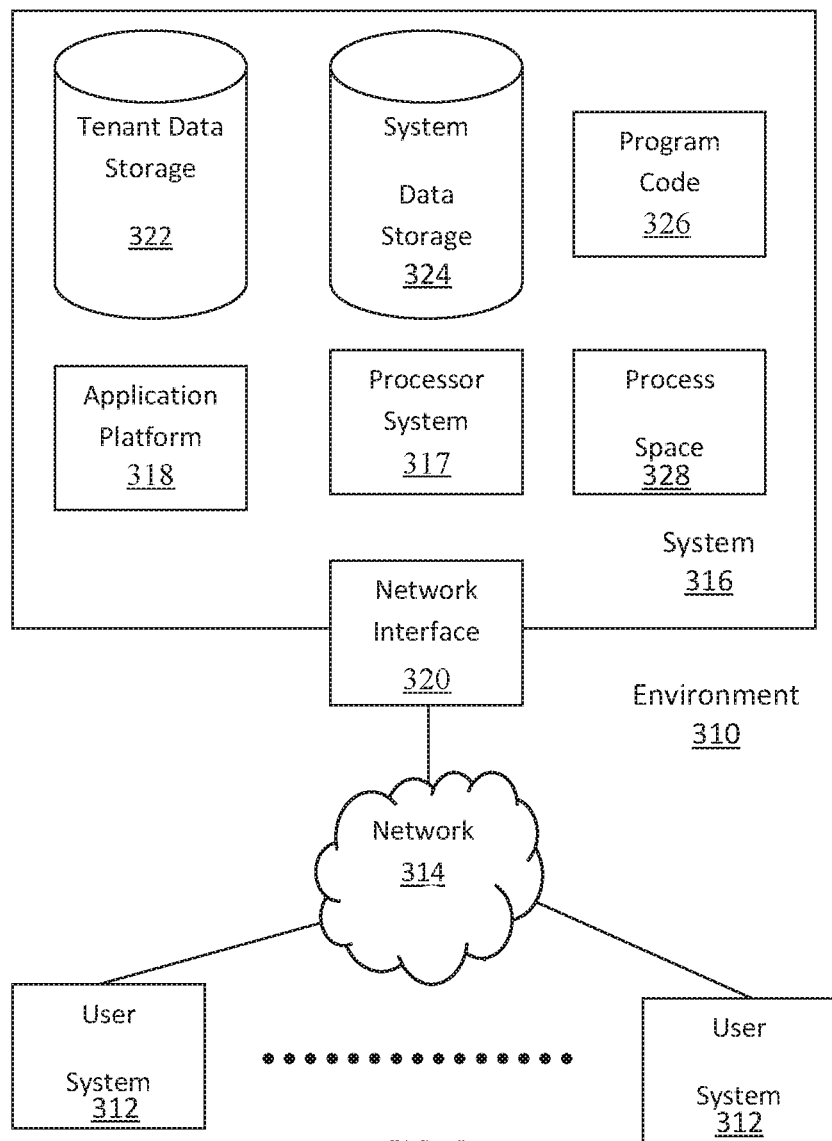
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 4:
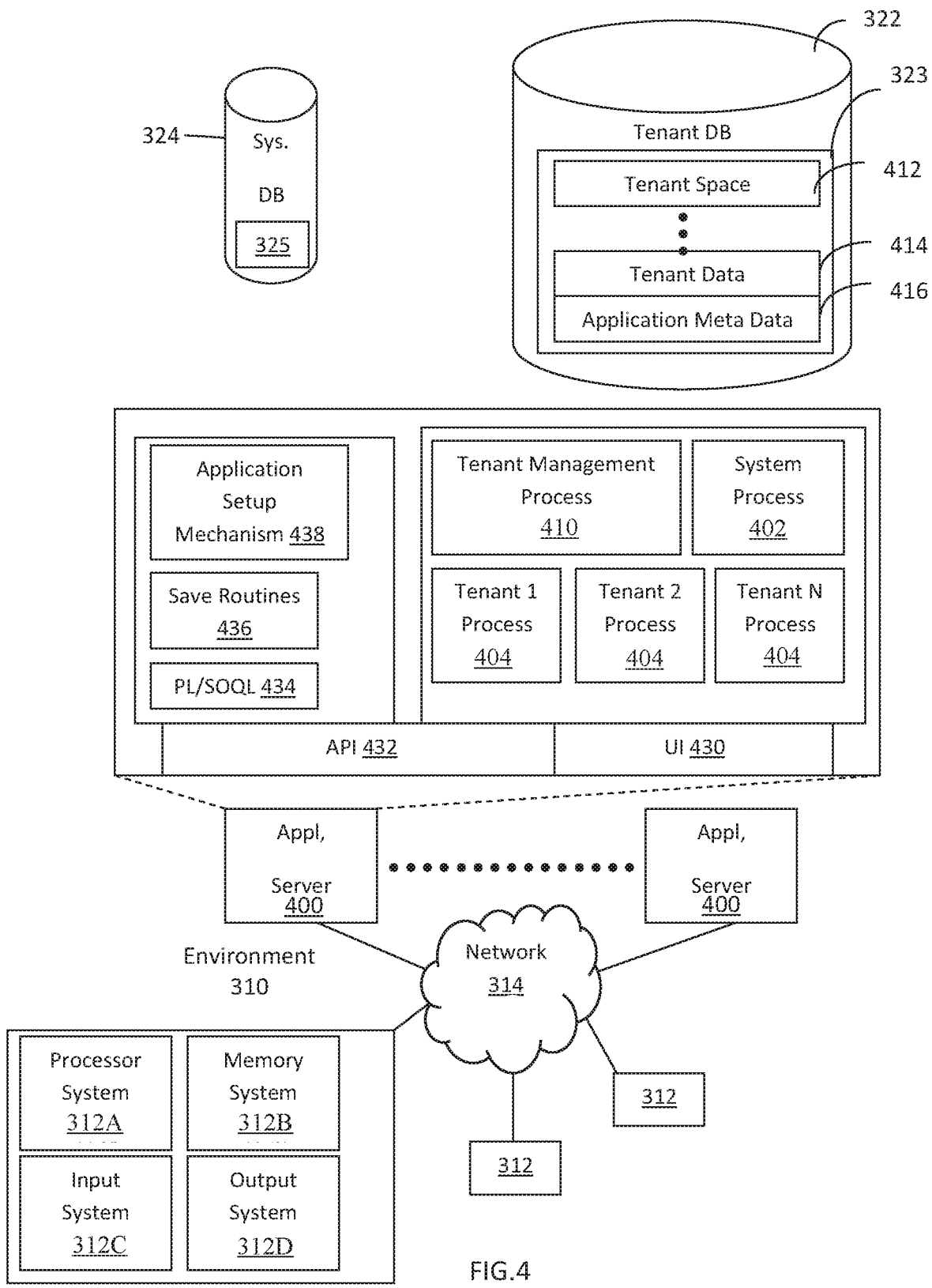
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers 4001-400N, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which may be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server 4001 might be coupled via the network 314 (e.g., the Internet), another application server 400N-1 might be coupled via a direct network link, and another application server 400N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also may be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
one or more processors; and
a non-transitory computer readable medium storing a plurality of instructions, which when executed, cause the one or more processors to:
train a machine-learning model to create attribute hierarchies comprising correlation probabilities between attributes across hierarchies;
create, by the trained machine-learning model, hierarchies of connected nodes connected by directed arcs, in response to identifying influences by attribute values on other attribute value probabilities, wherein each connected node represents an attribute;

parse a data set query that includes a first query attribute and a second query attribute;

identify a first hierarchy of connected nodes including a first node representing the first query attribute, and a second hierarchy of other connected nodes including a second node representing the second query attribute;

identify a directed arc connecting a first correlated node in the first hierarchy to a second correlated node in the second hierarchy;

identify-cross-hierarchy probabilities of correlations between values of a first attribute represented by the first correlated node in the first hierarchy and values of a second attribute represented by the second correlated node in the second hierarchy; and output an estimated count of a query result set, the estimated count generated from: i) the cross-hierarchy probabilities, ii) probabilities that the values of the first attribute represented by the first correlated node are associated with values of the first query attribute represented by the first node, and iii) probabilities that the values of the second attribute represented by the second correlated node are associated with values of the second query attribute represented by the second node.

2. The system of claim 1, comprising further instructions, which when executed, cause the one or more processors to:

identify, by the machine-learning model, an additional influence by the values of the other attribute on probabilities of values of an additional attribute; and modify, by the machine-learning model, the hierarchy comprising the other node representing the other attribute to further comprise an additional node representing the additional attribute, and an additional directed arc connecting the other node representing the other attribute to the additional node representing the additional attribute.

3. The system of claim 1, comprising further instructions, which when executed, cause the one or more processors to:

identify, by the machine-learning model, a correlation between the values of the first attribute that is represented by the first correlated node in the first hierarchy, and probabilities of the values of the second attribute that is represented by the second correlated node in the second hierarchy; and create, by the machine-learning model, the directed arc connecting the first correlated node in the first hierarchy to the second correlated node in the second hierarchy.

4. The system of claim 3, wherein identifying the correlation is based on determining whether values associated with a lowest correlated node in the first hierarchy have any correlation before determining whether values associated with a higher correlated node in the first hierarchy have any correlation, determining whether values associated with a highest correlated node in the first hierarchy have any correlation before determining whether values associated with a lowest correlated node in the second hierarchy have any correlation.

5. The system of claim 4, wherein identifying the correlation is further based on determining whether values associated with a higher correlated node in the second hierarchy have any correlation before determining whether values associated with a highest correlated node in the second hierarchy have any correlation, and terminating the determining when a hierarchical level of correlation is identified.

6. The system of claim 1, wherein the data set query further includes a third query attribute that lacks any connection to any hierarchy of connected nodes, and generating the estimated count is further based on independent probabilities associated with the third query attribute.

7. A computer program product comprising a non-transitory computer-readable medium having computer-readable program code embodied therein to be executed by one or more processors, the program code including instructions to:

train a machine-learning model to create attribute hierarchies comprising correlation probabilities between attributes across hierarchies;

create, by the trained machine-learning model, hierarchies of connected nodes connected by directed arcs, in response to identifying influences by attribute values on other attribute value probabilities, wherein each connected node represents an attribute;

parse a data set query that includes a first query attribute and a second query attribute;

identify a first hierarchy of connected nodes including a first node representing the first query attribute, and a second hierarchy of other connected nodes including a second node representing the second query attribute;

identify a directed arc connecting a first correlated node in the first hierarchy to a second correlated node in the second hierarchy;

identify cross-hierarchy probabilities of correlations between values of a first attribute represented by the first correlated node in the first hierarchy and values of a second attribute represented by the second correlated node in the second hierarchy; and output an estimated count of a query result set, the estimated count generated from: i) the cross-hierarchy probabilities, ii) probabilities that the values of the first attribute represented by the first correlated node are associated with values of the first query attribute represented by the first node, and iii) probabilities that the values of the second attribute represented by the second correlated node are associated with values of the second query attribute represented by the second node.

8. The computer program product of claim 7, wherein the program code comprises further instructions to:

identify, by the machine-learning model, an additional influence by the values of the other attribute on probabilities of values of an additional attribute; and modify, by the machine-learning model, the hierarchy comprising the other node representing the other attribute to further comprise an additional node representing the additional attribute, and an additional directed arc connecting the other node representing the other attribute to the additional node representing the additional attribute.

9. The computer program product of claim 7, wherein the program code comprises further instructions to:

identify, by the machine-learning model, a correlation between the values of the first attribute that is represented by the first correlated node in the first hierarchy, and probabilities of the values of the second attribute that is represented by the second correlated node in the second hierarchy; and create, by the machine-learning model, the directed arc connecting the first correlated node in the first hierarchy to the second correlated node in the second hierarchy.

10. The computer program product of claim 9, wherein identifying the correlation is based on determining whether values associated with a lowest correlated node in the first hierarchy have any correlation before determining whether values associated with a higher correlated node in the first hierarchy have any correlation, determining whether values associated with a highest correlated node in the first hierarchy have any correlation before determining whether values associated with a lowest correlated node in the second hierarchy have any correlation.

11. The computer program product of claim 10, wherein identifying the correlation is further based on determining whether values associated with a higher correlated node in the second hierarchy have any correlation before determining whether values associated with a highest correlated node in the second hierarchy have any correlation, and terminating the determining when a hierarchical level of correlation is identified.

12. The computer program product of claim 7, wherein the data set query further includes a third query attribute that lacks any connection to any hierarchy of connected nodes, and generating the estimated count is further based on independent probabilities associated with the third query attribute.

13. A method comprising:
training a machine-learning model to create attribute hierarchies comprising correlation probabilities between attributes across hierarchies;
create, by the trained machine-learning model, hierarchies of connected nodes connected by directed arcs, in response to identifying influences by attribute values on other attribute value probabilities, wherein each connected node represents an attribute;
parsing, by a database system, a data set query that includes a first query attribute and a second query attribute;
identifying, by the database system, a first hierarchy of connected nodes including a first node representing the first query attribute, and a second hierarchy of other connected nodes including a second node representing the second query attribute;
identifying, by the database system, a directed arc connecting a first correlated node in the first hierarchy to a second correlated node in the second hierarchy;
identifying, by the database system, cross-hierarchy probabilities of correlations between values of a first attribute represented by the first correlated node in the first hierarchy and values of a second attribute represented by the second correlated node in the second hierarchy; and
outputting, by the database system, an estimated count of a query result set, the estimated count generated from: i) the cross-hierarchy probabilities, ii) probabilities that the values of the first attribute represented by the first correlated node are associated with values of the first query attribute represented by the first node, and iii) probabilities that the values of the second attribute represented by the second correlated node are associated with values of the second query attribute represented by the second node.

14. The method of claim 13, the method further comprising:
identifying, by the machine-learning model, an additional influence by the values of the other attribute on probabilities of values of an additional attribute; and
modifying, by the machine-learning model, the hierarchy comprising the other node representing the other attribute to further comprise an additional node representing the additional attribute, and an additional directed arc connecting the other node representing the other attribute to the additional node representing the additional attribute.

15. The method of claim 13, the method further comprising:
identify, by the machine-learning model, a correlation between the values of the first attribute that is represented by the first correlated node in the first hierarchy, and probabilities of the values of the second attribute that is represented by the second correlated node in the second hierarchy; and
create, by the machine-learning model, the directed arc connecting the first correlated node in the first hierarchy to the second correlated node in the second hierarchy.

16. The method of claim 15, wherein identifying the correlation is based on determining whether values associated with a lowest correlated node in the first hierarchy have any correlation before determining whether values associated with a higher correlated node in the first hierarchy have any correlation, determining whether values associated with a highest correlated node in the first hierarchy have any correlation before determining whether values associated with a lowest correlated node in the second hierarchy have any correlation, determining whether values associated with a higher correlated node in the second hierarchy have any correlation before determining whether values associated with a highest correlated node in the second hierarchy have any correlation, and terminating the determining when a hierarchical level of correlation is identified.

17. The method of claim 13, wherein the data set query further includes a third query attribute that lacks any connection to any hierarchy of connected nodes, and generating the estimated count is further based on independent probabilities associated with the third query attribute.

* * * * *